(No Model.)

J. FLEISCHER.
Steam Cooking Apparatus.

No. 242,525. Patented June 7, 1881.

WITNESSES:
A. B. Robertson
A. M. Tanner

INVENTOR:
J. Fleischer
BY A. Schücking & Co.
ATTORNEYS.

UNITED STATES PATENT OFFICE.

JOHANNES FLEISCHER, OF COLOGNE, GERMANY.

STEAM COOKING APPARATUS.

SPECIFICATION forming part of Letters Patent No. 242,525, dated June 7, 1881.

Application filed January 8, 1881. (No model.) Patented in France August 29, 1879, and in Germany April 4, 1880.

*To all whom it may concern:*

Be it known that I, JOHANNES FLEISCHER, a citizen of Germany, residing at Cologne, in the Empire of Germany, have invented certain new and useful Improvements in Steam Cooking Apparatus; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The present invention relates to that class of cooking apparatus in which steam is the agent for heating a series of pots or food-receptacles arranged within an outer shell or casing.

The object of my invention is to improve upon the construction of devices of the above character, so as to obtain greater simplicity of the component parts and permit articles of food to be cooked in various ways.

To these ends the invention consists in the construction and combination of parts, which will be hereinafter more fully described, and then indicated in the claim.

Figure 1:
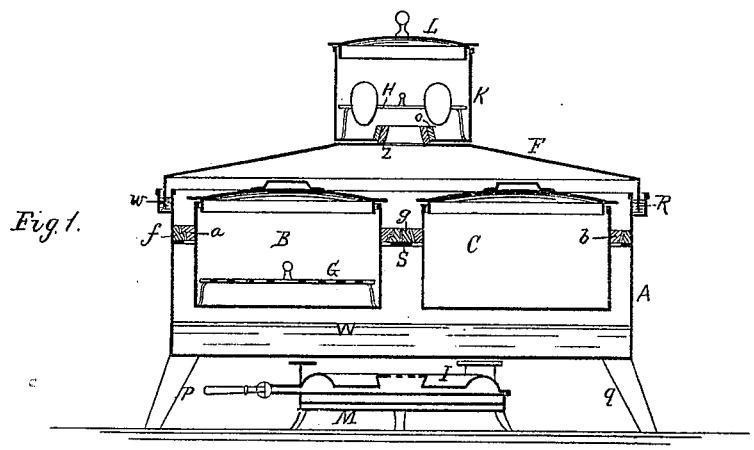
Figure 2:
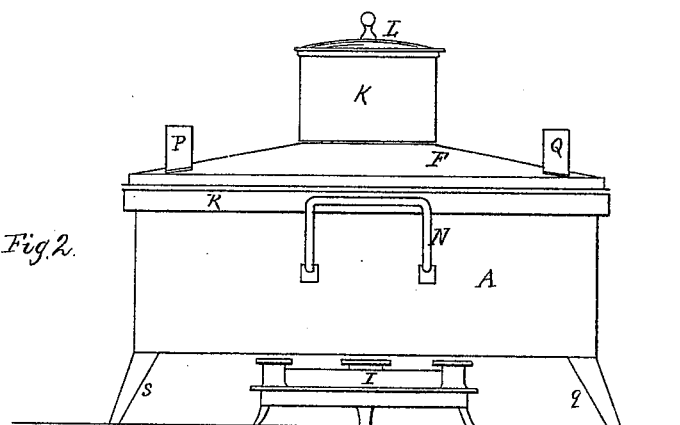
Figure 3:
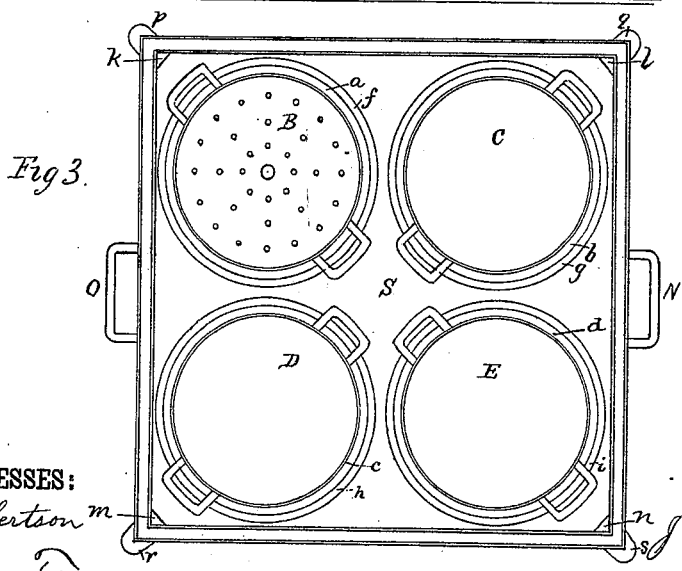

In the drawings, Figure 1 is a vertical sectional view of a cooking apparatus embodying my improvements. Fig. 2 is a side elevation thereof. Fig. 3 is a top view of the apparatus with the cover removed.

The letter A designates a rectangular or other suitably shaped shell or casing, which is supported at a proper distance above a gas or petroleum heating device, M, by means of the legs or feet $p$ $q$ $r$ $s$, applied to the corners of said shell or casing. The lower portion of the latter serves for the reception of water and constitutes the steam-generating chamber W. A partition-plate or diaphragm, S, secured to the shell or casing, near the top thereof, serves to form an upper chamber, which is designed for the reception of a nest of pots or food-receptacles, B C D E. This partition-plate is suitably apertured for the reception of the pots, which extend down into the steam and water chamber W. The apertures or pot-holes in the partition-plate are provided with beveled rings $f$ $g$ $h$ $i$, which, in connection with correspondingly-shaped rings or ring-shaped flanges $a$ $b$ $c$ $d$, secured to the various pots, serve to form a steam-tight joint between the upper and lower chambers, or, in other words, the passage of steam through the pot-holes is made impossible. The pots fitted into the apertured partition-plate are of any preferred form or construction, and are provided with suitable covers $x$ $y$. One of the pots (designated by letter B) contains a perforated false bottom, C, and is specially adapted for steaming potatoes or other vegetables. The other pots or vessels can be used for preparing soups, and for stewing, roasting, baking, and cooking purposes in general.

The shell or casing A is provided with a trough-shaped top rim, R, which serves for the reception of water, and the bottom rim or flange of a cover, F. The object of this arrangement is to form a steam-tight joint between the shell and cover by placing a water-seal between these parts. The top of the cover is apertured, and is provided with an open-ring-shaped projection, $z$, made preferably in the form of a frustum of a cone. A correspondingly-shaped ring, $o$, let into an opening in the bottom of a cooking-vessel, K, fits on said projection $z$ and serves to form a communication between the lower cooking-chamber and the cooking-vessel supported upon the cover in the above-described manner. The cooking-vessel K is generally employed for cooking eggs, and is provided for this purpose with an apertured shelf or egg-holder, H. It also possesses a removable top or cover, L. The contents of this vessel K are heated or cooked by means of steam entering the same through the open ring $z$ of the cover E.

It has been stated that a steam-tight joint is formed between the various pots and the steam-generating chamber, so as to cook the contents of pots by the indirect action of steam. I provide means, however, for the direct use of steam for cooking purposes, and also to supply steam to the upper vessel, K, supported by the cover, and this is effected by forming small openings $k$ $l$ $m$ $n$ at the four corners of the partition-plate or diaphragm S, as is shown in Fig. 3. These openings serve for conveying steam to the upper or pot chamber, and when the lids or covers of the pots are removed steam can be brought in direct contact with the food contained in said pots. Water is supplied to the steam-generating chamber by pouring it on the partition-plate, from whence it will flow through the openings in said plate to the bottom chamber.

The apparatus illustrated in the present instance is portable in every sense of the word, and is specially adapted to be heated by means of a gas stove or burner, I, which is connected with a double bottom, M, the object whereof is to prevent the downward radiation of heat.

In order to prevent a too great condensation of the steam and loss of heat the entire apparatus may be inclosed in a jacket or outer covering of wood or other non-conducting material.

Suitable handles N O are applied to the shell or casing for transporting purposes, and the cover E is provided with handles P Q for a like object.

In place of the hydraulic seal for insuring a steam-tight joint between the cover E and casing A, I may substitute beveled strips of wood, or else I may resort to a rubber or felt gasket seated in a suitable groove of either the shell or the cover.

The short tube or hollow projection $z$ is the means of communication between the vessel K and lower chamber, and for regulating the passage of steam through said tube a suitable stop-cock or valve may be provided.

It may be stated that the steam generated in the chamber W circulates first around the various pots projecting into said chamber, and then passes through the free openings in the partition-plate into the upper chamber and heats the contents of the pots indirectly or directly, according as the covers of said pots are on or off. A portion of the steam flows back into the generator as condensed water, and the remainder passes through the tube $z$ into the egg-cooker K, and cooks the eggs therein by steam-heat. This receptacle K may also be provided with a perforated shelf or support, and be used for steaming vegetables and other articles.

Having thus described my invention, what I claim as new, and desire to secure by Letters Patent, is—

In a steam cooking apparatus, the combination of the outer shell or casing, the partition-plate or diaphragm for dividing the same into a lower steam-generating chamber and upper pot-chamber, the beveled angular rings let into apertures in said partition-plate, and the pots provided with correspondingly-shaped rings and the detachable cover, as and for the purpose set forth.

In testimony whereof I affix my signature in presence of two witnesses.

JOHANNES FLEISCHER.

Witnesses:
ADOLPH MÜLLER,
MARTIN HEHR.